United States Patent [19]

Georgiev

[11] 3,911,726

[45] Oct. 14, 1975

[54] ULTRASONIC METHOD FOR MEASURING OF PARAMETERS OF LIQUIDS

[75] Inventor: Georgi Iliev Georgiev, Sofia, Bulgaria

[73] Assignee: VMGI, Sofia, Bulgaria

[22] Filed: Mar. 20, 1973

[21] Appl. No.: 343,006

[52] U.S. Cl. .................. 73/32 A; 73/53; 73/67.5 R
[51] Int. Cl.² ...................... G01N 9/24; G01N 29/02
[58] Field of Search ......... 73/67.1, 67.2, 67.5, 67.6, 73/67.7, 67.8, 67.9, 24, 53, 32 A

[56] References Cited
UNITED STATES PATENTS

| | | | |
|---|---|---|---|
| 3,093,998 | 6/1963 | Albertson et al. | 73/67.7 |
| 3,283,562 | 11/1966 | Heisig et al. | 73/67.1 |
| 3,710,615 | 1/1973 | Johnson et al. | 73/67.7 |

Primary Examiner—Richard C. Queisser
Assistant Examiner—John P. Beauchamp
Attorney, Agent, or Firm—Karl F. Ross; Herbert Dubno

[57] ABSTRACT

An ultrasonic method of determining parameters of a liquid traversing a pipeline in which an ultrasonic wave is directed against a wall of the pipeline at one point along an arc segment through an acoustic-transmission liquid and ultrasonic waves are detected along this arc segment at another point by a focusing receiver. The signal representing the transmitted wave and the received wave are compared in a phase detector, the output of which provides an indication of a parameter of the liquid.

1 Claim, 1 Drawing Figure

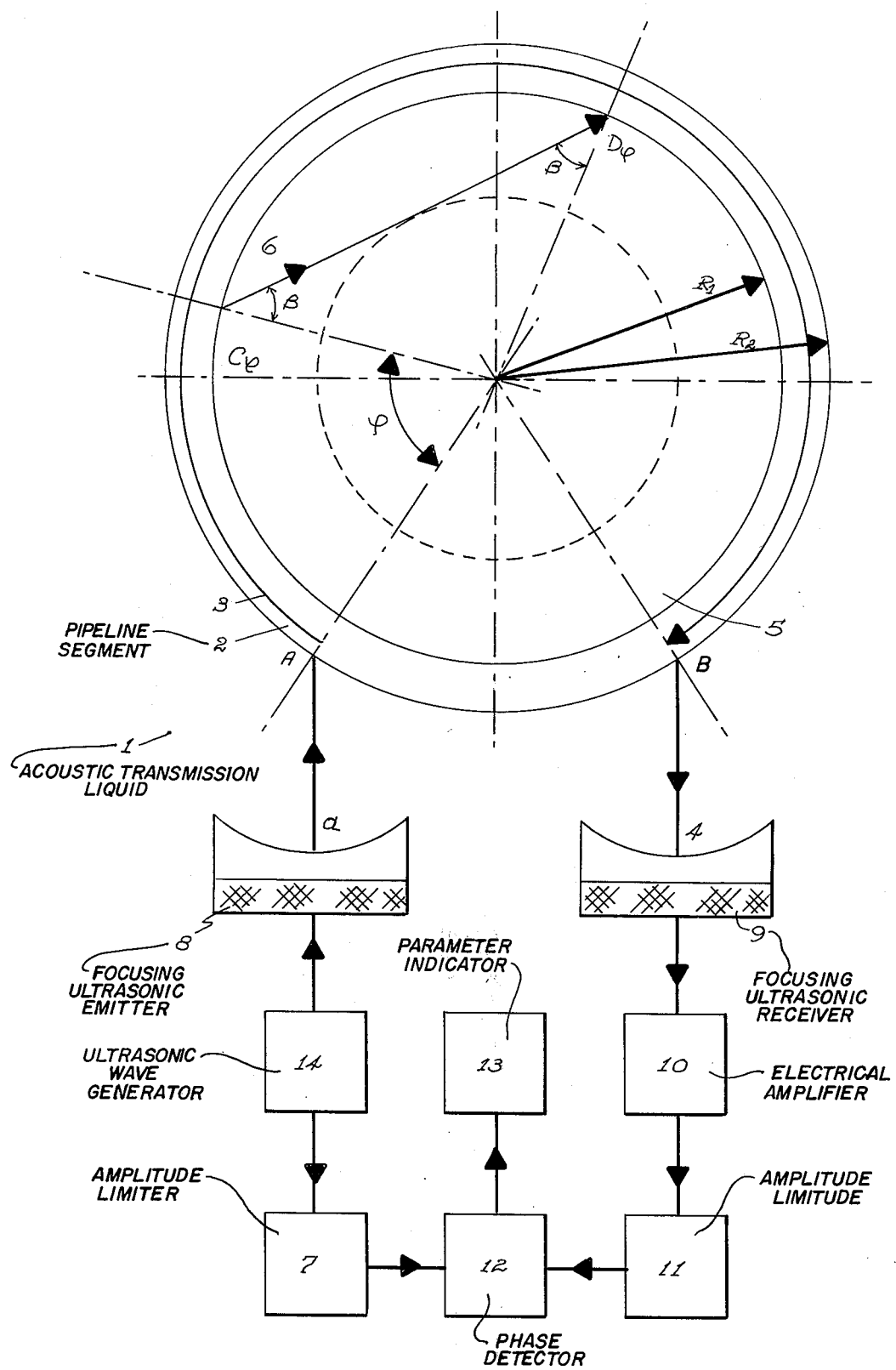

ULTRASONIC METHOD FOR MEASURING OF PARAMETERS OF LIQUIDS

The present invention relates to an ultrasonic method for measuring parameters of a liquid instantaneously in a pipeline traversed by the liquid.

A method for measuring liquid parameters is known, wherein the liquid is flowing through a pipe-line and the ultrasonic wave is introduced in the controled liquid, which (wave) is received after traversing the liquid and the amplitude of the received signal is measured. The method has the following disadvantage: when checking liquids possessing a high damping decaying coefficient of the ultrasonic wave, the amplitude of the ultrasonic signal after traversing the liquid is substantially decreased and is of the level of the noise signals.

Another significant disadvantage of this method is the small transmittance coefficient of the ultrasonic signal from the emitter in the liquid. Another disadvantage of this method resides in the impossibility of hindering entirely the transfer of a part of the ultrasonic energy immediately to the wall of the pipeline, bypassing the checked liquid and increasing the level of the noise signal.

The object of the present invention is to provide an ultrasonic method for checking the parameters of the flowing liquid instantaneously in the pipeline, which is devoid of the aforementioned disadvantages.

This object is attained, if in the wall of the bow of the pipeline a circular normal wave is induced, which wave is accepted to be at an arbitrary distance on the bow of the pipeline from the place of the inductance and according to the phase, is determined (measured) the values of the checked parameters of the liquid flowing in the pipeline.

More details for explanation of the method according to the invention are given in the sole FIGURE of the drawing which is a diagram illustrating the invention.

By means of longitudinal ultrasonic waves $a$ focused at the point A on the wall of the pipeline 2 located in the unconfined liquid medium 1, on the bow or arc are induced different kinds of oscillations of the circular normal ultrasonic waves 3. The longitudinal ultrasonic wave 4, emitted from the wall of the pipeline is received in the point B and according to the amplitude, the time and the phase difference between the emitted and the received ultrasonic oscillations it is possible to determine the changes (the variations) of the different kinds of parameters of the liquid 5.

The propagating normal ultrasonic wave 3 in the wall of the circumferential arc segment A–B of the pipeline 2 is emitted at every point in the checked liquid 5 as a longitudinal ultrasonic wave 6. The angle $\beta$ and the length of the chord $C_{(\varphi)}D_{(\varphi)} = 2R_1 \cos\beta$ depends on the speed of the ultrasonic waves in the checked liquid, which speed appears to be a function of the density, of the temperature, of the pressure and the other physical properties of the checked liquid, where $R_1$ is the internal radius of the pipe. In this way the longitudinal ultrasonic wave 6 reaches the point $D_{(\varphi)}$ with a different phase and under a different angle $\beta$ depending on its speed in the checked liquid. This also means that this wave is influenced depending upon the amplitude of the normal ultrasonic wave 3 and upon its phase speed. If the liquid has a damping effect, the parameters of the normal wave depend on the value of the damping of the ultrasonic waves in the checked liquid. The parameters of the normal ultrasonic wave appears to be a function of the speed of the ultrasonic waves in the checked liquid and of its (of the liquid) density, temperature, pressure and others physical properties. The last circumstance allows, when a great damping of the ultrasonic waves is present in the checked liquid 5, the normal ultrasonic wave 3 to continue to give alone information about the properties of the checked liquid in cases also when the amplitude of the wave 6 disappears entirely at the point $D_{(\varphi)}$. This is an important feature distinguishing the method according to the present invention from the so far existing methods.

The method according to the present invention can be implemented also by means of a device consisting of an electric generator 14 simultaneously connected to the amplitude limiter 7 and the focusing ultrasonic emitter 8. The emitter 8 by means of an immersion liquid 1 is acousticaly connected to the pipeline 2 filled with the checked liquid 5. The immersion liquid 1 serves simultaneously as an acoustic contact between the pipeline 2 and the focused ultrasonic receiver 9. The latter by means of an electrical amplifier 10 is connected to the amplitude limiter 11. The amplitude limiters 7 and 11 are connected to the indicator 13 by means of the phase detector 12.

One of the most important features of the proposed method according to the present invention is the fact that the measured value does not depend on the speed of the flow of the checked liquid, which makes it exceptionally appropriate for the control of the technological processes of the chemical the food industries and other branches of the industry.

What we claim is:

1. A method of instantaneously measuring a parameter of a liquid traversing a cylindrical pipeline, comprising the steps of: training an ultrasonic wave against an external wall of said pipeline in an offradial direction to generate an elastic wave in the wall thereof, whereby longitudinal ultrasonic waves are transmitted through the fluid to another point of the same wall; detecting a longitudinal wave emitted from the external wall of said pipeline at another point therealong in the same plane as that at which the ultrasonic wave was trained on said pipeline and at a point circumferentially spaced therefrom at the same angle to the radius at which the ultrasonic wave was trained on said wall; generating electrical signals representing the initial ultrasonic wave and the detected ultrasonic wave; and comparing the phases of said signals to obtain an evaluation of said parameter.

* * * * *